United States Patent
Paugh Lawrence et al.

(10) Patent No.: US 9,452,110 B1
(45) Date of Patent: Sep. 27, 2016

(54) PACIFIER HOLDER ASSEMBLY AND METHOD

(71) Applicants: Jessie Elin Paugh Lawrence, Temecula, CA (US); Christopher Robert Paugh Lawrence, Temecula, CA (US)

(72) Inventors: Jessie Elin Paugh Lawrence, Temecula, CA (US); Christopher Robert Paugh Lawrence, Temecula, CA (US)

(73) Assignee: Solace Anesthesia Inc., Temecula, CA (US)

( * ) Notice: Subject to any disclaimer, the term of this patent is extended or adjusted under 35 U.S.C. 154(b) by 0 days.

(21) Appl. No.: 14/840,354

(22) Filed: Aug. 31, 2015

(51) Int. Cl.
*A47D 15/00* (2006.01)
*F16M 13/02* (2006.01)

(52) U.S. Cl.
CPC ........... *A61J 17/001* (2015.05); *F16M 13/022* (2013.01)

(58) Field of Classification Search
CPC .......... A61J 9/06; A61J 9/0638; A61J 9/063; A61J 9/0661; A61J 9/0684; A61J 9/0607; A61J 9/00; A61J 9/0669; A61J 9/0692; A61J 9/0676; A61J 9/0646; A61J 9/08; A61J 9/0623; A61J 9/001; A61J 11/002
USPC ......... 248/102, 103, 104; 606/234, 235, 236
See application file for complete search history.

(56) References Cited

U.S. PATENT DOCUMENTS

| | | | |
|---|---|---|---|
| 2,811,949 A | 11/1957 | Rothbard | |
| 3,635,431 A * | 1/1972 | Mariner | A61J 9/06 248/104 |
| 4,630,793 A * | 12/1986 | Hunter | A61J 9/06 248/102 |
| 4,697,589 A | 10/1987 | King et al. | |
| 4,969,894 A | 11/1990 | Hempstead-Harris | |
| 5,147,384 A | 9/1992 | La Rocca | |
| D337,385 S | 7/1993 | Lussier | |
| 5,263,975 A | 11/1993 | La Rocca | |
| 5,391,184 A | 2/1995 | Rosenthal | |
| 5,534,014 A | 7/1996 | Demeritt et al. | |
| D402,760 S | 12/1998 | Kline | |
| 5,927,661 A * | 7/1999 | Tinsley | A61J 9/06 248/102 |
| D415,837 S | 10/1999 | Williams | |
| 6,213,547 B1 * | 4/2001 | Bowe | A61J 9/06 248/102 |
| 6,221,093 B1 | 4/2001 | Prince | |
| 6,640,985 B1 * | 11/2003 | Cheng | A63H 33/006 211/118 |
| 6,732,375 B2 | 5/2004 | Nornes | |
| 7,188,810 B1 * | 3/2007 | Lasky | A61J 9/06 248/103 |
| D687,953 S | 8/2013 | Mohammadi et al. | |
| 2014/0121702 A1 * | 5/2014 | Ezra | A61J 17/00 606/234 |

* cited by examiner

*Primary Examiner* — Steven Marsh
(74) *Attorney, Agent, or Firm* — Loyal McKinley Hanson (57) ABSTRACT

A method for holding a pacifier within easy reach of a child in a crib includes the step of providing a pacifier-holding assembly having a length sufficient for the assembly to be draped between top end rails of the crib while holding the pacifier near the child. Structurally, an elongated assembly includes a cloth cover component over a longitudinally extending elastic band and two transversely extending elastic strips that are disposed on opposite sides of a pacifier-receiving opening in the cover component. The user presses the pacifier into the opening in opposition to the elastic strips while they cooperate with the elastic band and the cover component to removably hold the pacifier in place so that a nipple-simulating member of the pacifier extends outwardly away from the assembly. Mounting components removably attach the assembly to the top end rails.

6 Claims, 7 Drawing Sheets

PACIFIER HOLDER ASSEMBLY AND METHOD

BACKGROUND OF THE INVENTION

1. Technical Field

This invention relates generally to the fields of pediatrics and pacifiers, and more particularly to a pacifier holder assembly and method for holding a pacifier near the face of an infant of other young child lying in their crib.

2. Description of Related Art

The term "pacifier" herein refers to the well-known device that an infant or other young child sucks upon. A typical pacifier includes a nipple-simulating member on a mouth shield with a handle. The nipple-simulating member is usually composed of rubber, plastic, silicone, or other such material. The mouth shield and handle are usually composed of plastic, and they are sized large enough to avoid the child choking on or swallowing the pacifier. The pacifiers available at various internet accessible retail stores under the registered U.S. trademark "NUK" provide examples.

Some parents keep a pacifier within easy reach of their child in order to help avoid loss of their child's ability to associate the suck-swallow reflex with receiving nourishment. Their child may, for example, receive nourishment via a nasogastric tube or a parenternal catheter in the treatment of various disorders (e.g., cleft palate or severe acid reflux). Receiving nourishment through a tube or catheter, however, risks loss of the brain's association of the suck-swallow reflex with nourishment. Pediatricians and other medical professionals recognize that nonnutritive sucking on a pacifier seems to help.

Some existing patents disclose pacifier arrangements intended to keep a pacifier within easy reach for use by a child. For example, U.S. Pat. No. 5,263,975 describes a pacifier arrangement intended to promote nonnutritive sucking by holding the pacifier on an infant-graspable tether that the parents can put under their infant's check or otherwise close to their infant. U.S. Pat. Nos. 4,697,589; 4,969,894; 5,147,384; 5,391,184; 5,534,014; 6,221,092; 6,732,375; D337,385; D402,760; D415,837; and D687,953 describe other pacifier arrangements. Nevertheless, an effective pacifier arrangement for such use remains elusive.

SUMMARY OF THE INVENTION

In view of the foregoing, it is a primary objective of the present invention to alleviate the concern outlined above in order to promote nonnutritive sucking, especially for the purpose of retaining the association of the suck-swallow reflex with receiving nourishment. The present invention achieves this objective by providing a more effective pacifier holder assembly and method for an infant or other young child in a crib. The pacifier holder assembly attaches to and drapes between the top side rails of the crib in a position such that the nipple-simulating member of the pacifier is held close to the child's face where it can induce the routing reflex and lead to the suck-swallow reflex without posing a threat of entanglement.

To paraphrase some of the more precise language appearing in the claims and further introduce the nomenclature used, a method for holding a pacifier close to the face of a child lying in a crib according to the methodology of the present invention includes the step of providing an elongated pacifier holder assembly having a length sufficient to be draped between the top side rails of the crib; the pacifier holder assembly is such as to include a middle section for holding the pacifier, along with mounting components for attaching the middle section to the top side rails. The method proceeds by (a) mounting the pacifier on the middle section of the pacifier holder assembly and (b) attaching the assembly to the opposite top side rails of the crib so that the nipple of the pacifier extends downwardly from the middle section of the assembly into close proximity of the face of the child.

In line with the foregoing, a pacifier holder assembly constructed according to the structural aspects of the invention is an elongated assembly having a length sufficient for the assembly to be draped across the opposite top side rails of the crib. The assembly includes a middle section with a pacifier-holding portion for holding the pacifier. The assembly also includes mounting components for holding the middle section on the top side rails of the crib. A user removably mounts the pacifier on the pacifier-holding portion of the middle section, and uses the mounting components to mount the middle section on the opposite top side rails of the crib so that the pacifier extends downwardly to a position close to the face of a child lying in the crib.

Thus, the present invention safely and conveniently facilitates nonnutritive sucking, especially for the purpose of retaining the association of the suck-swallow reflex with receiving nourishment; it does so by holding a pacifier close to the face of a child lying in the crib using a pacifier holder assembly draped across and attached to the top side rails of the crib. With the pacifier held that way, the nipple-simulating member can induce the routing reflex and lead to the suck-swallow reflex without the pacifier holder assembly posing a threat of entanglement. In addition, the pacifier holder assembly can be used apart from the crib, on a child car seat for example. The following detailed description and accompanying illustrative drawings make the foregoing and other objectives, features, and advantages of the invention more apparent.

DESCRIPTION OF THE PREFERRED EMBODIMENTS

Figure 1:
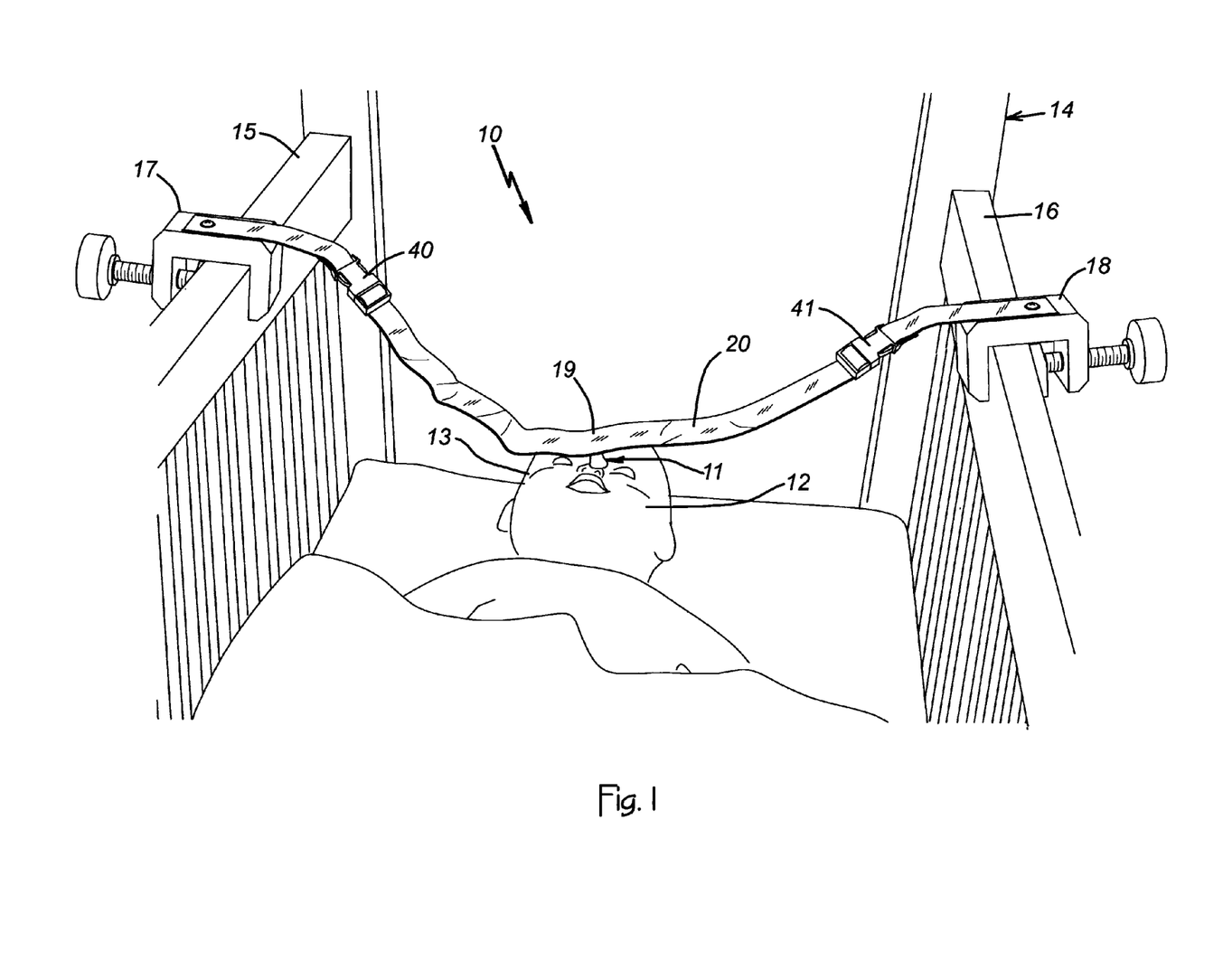
FIG. 1 of the drawings is a perspective view of a pacifier holder assembly constructed according to the present invention, shown draped across the top side rails of a crib according to the methodology of the invention.
Figure 2:
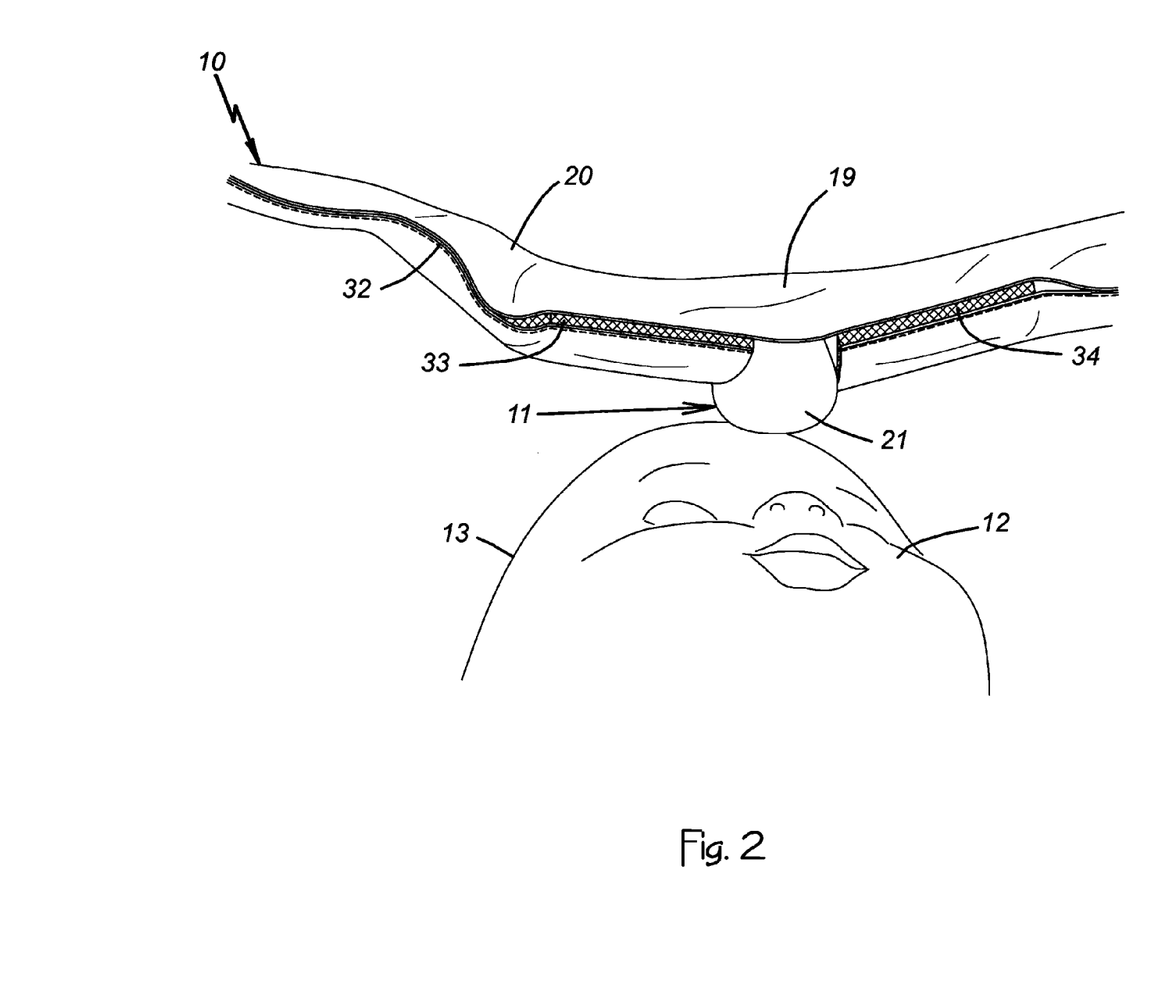
FIG. 2 of the drawings is an enlarged portion of the middle section of the assembly, showing the pacifier held close to the face of a child lying in the crib.

A pacifier holder assembly constructed according to the present invention is identified in FIG. 1 of the drawings as an assembly 10. The assembly 10 is shown holding a pacifier 11 near the face 12 of a child 13 lying in a crib 14. The assembly 10 is mounted on the crib 14 in a position draped loosely over and spanning first and second top side rails 15 and 16 of the crib 14. First and second mounting components 17 and 18 hold the assembly 10 on the first and second side rails 15 and 16. So mounted, a pacifier-holding portion 19 of a middle section 20 of the assembly 10 drapes downwardly toward the child 13, thereby positioning a nipple-simulating member 21 of the pacifier 11 as desired, near the face 12 of the child 13. The member 21 of the pacifier 11 is identified in FIG. 2.

The crib 14 represents any of various crib sizes and shapes. In the United States, for example, 16 CFR §1508.3 specifies that the interior crib dimensions shall be 71±1.6 centimeters (28±⅝ inches) wide as measured between the innermost surfaces of the crib sides and 133±1.6 centimeters (52⅜±⅝ inches) long as measured between the innermost surfaces of the crib end panels, slats, rods, or spindles. Both of those measurements are to be made at the level of the mattress support spring in each of its adjustable positions and no more than 5 centimeters (2 inches) from the crib corner posts or from the first spindle to the corresponding point of the first spindle at the other end of the crib. If a crib has contoured or decorative spindles, in either or both of the sides or ends, the measurement shall be determined from the largest diameter of the first turned spindle within a range of 10 centimeters (4 inches) above the mattress support spring in each of its adjustable positions, to a corresponding point on the first spindle or innermost surface of the opposite side of the crib. In addition, the height of the rail and end panel as measured from the top of the rail or panel in its lowest position to the top of the mattress support in its highest position shall be at least 22.8 centimeters (9 inches). The height of the rail and end panel as measured from the top of the rail or panel in its highest position to the top of the mattress support in its lowest position shall be at least 66 centimeters (26 inches).

The foregoing dimensioning regulations are stated for reference, by way of example. The illustrated assembly 10 is intentionally sized and shape to accommodate cribs that are manufactured consistent with those regulations. Of course, the precise size and shape of a pacifier holder assembly constructed according to the present invention may vary significantly from those dimensions according to the crib with which the assembly 10 is intended for use.

Further details of the assembly 10 are shown in FIGS. 3, 4, 5, 6, and 7. A manufacturer or other fabricator forms the middle section 20 (FIGS. 1 through 5) by sewing (i.e., stitching) together a 36-inches long by 5-inches wide panel 31 of material (e.g., a baby-friendly length of soft, breathable, flexible cloth material), a twenty-inches long by one-inch wide by one-sixteenth-inch thick elastic band 32 that extends along an axis of elongation 32A identified in FIGS. 3 and 4, and two 2.5-inches long by one-inch wide by one-sixteenth-inch thick elastic strips 33 and 34. The elastic band 32 and the elastic strips 33 and 34 may, for example, be lengths of a commercially available, one-sixteenth-inch thick, elastic band of the type commonly used for clothes, crafts, and so forth.

Figure 3:
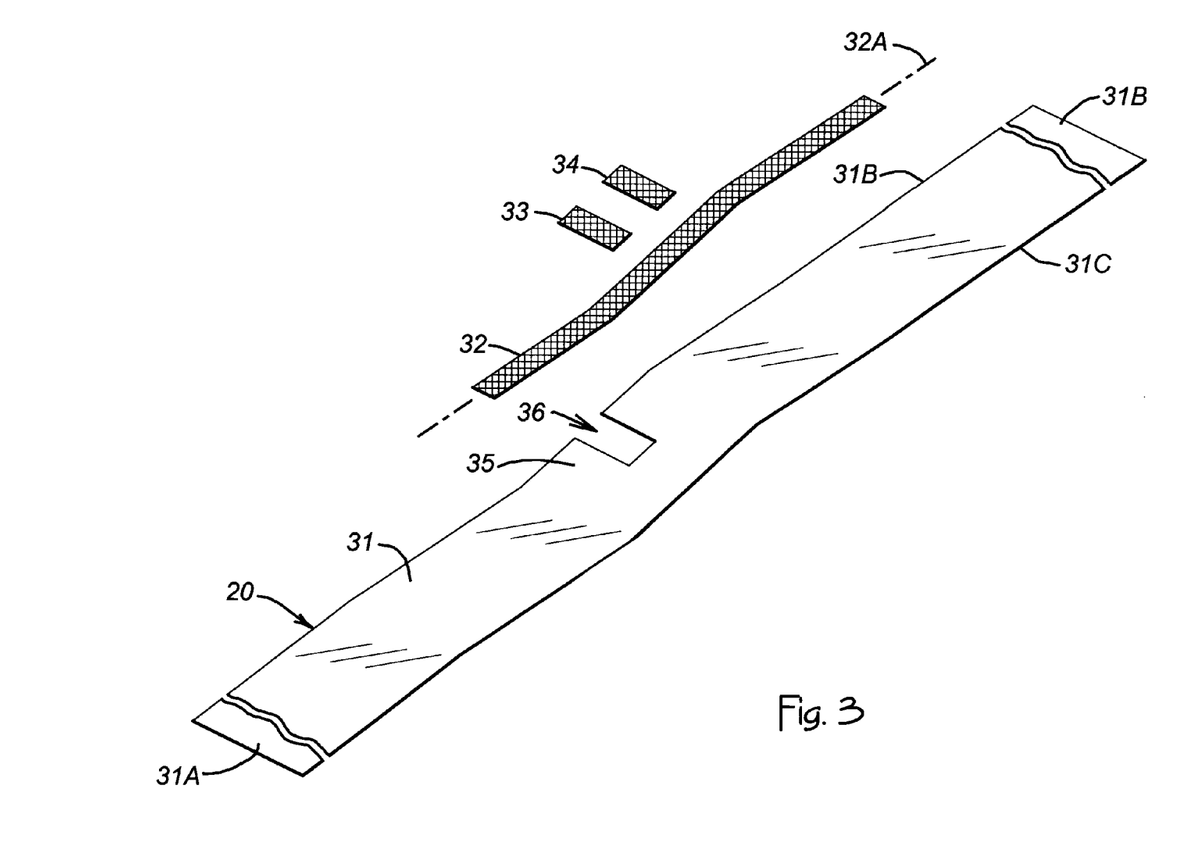
FIG. 3 is an exploded view of various components of the middle section, with the cloth cover component shown foreshortened for illustrative purposes.
Figures 4, 5:
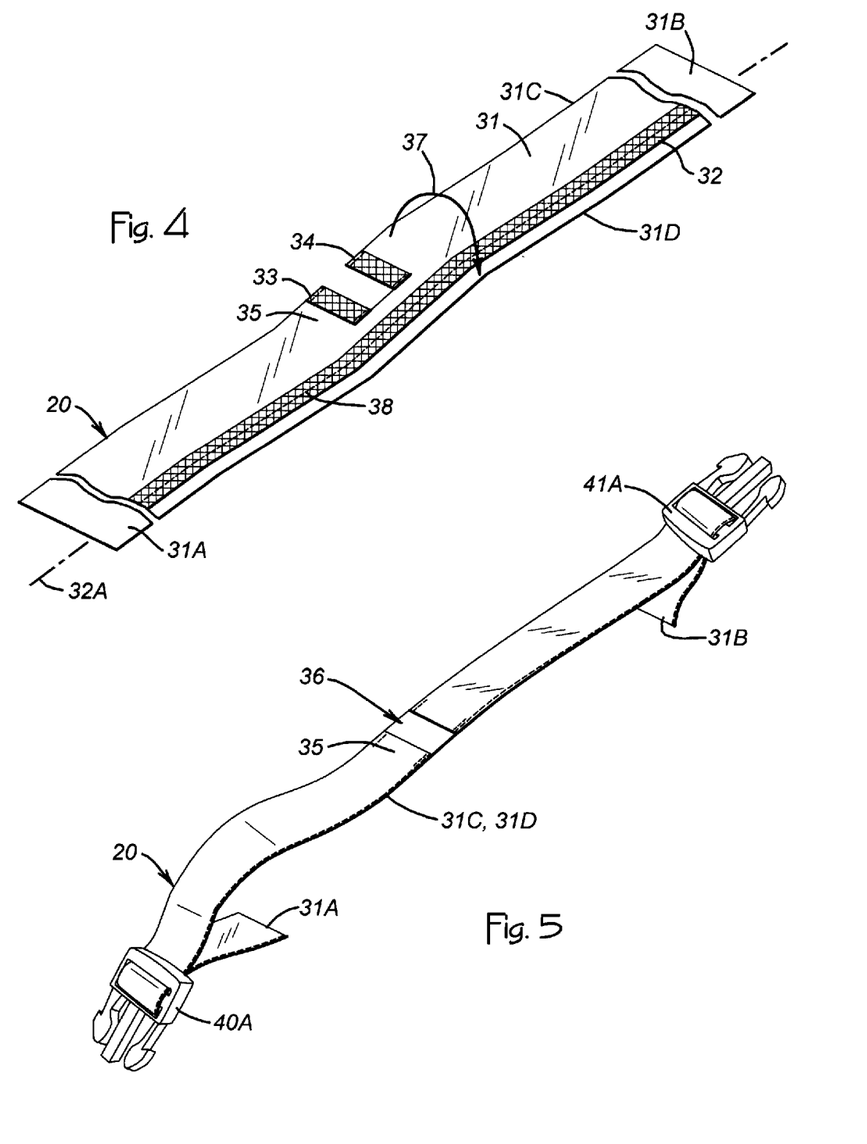
FIG. 4 shows the cloth cover component (foreshortened) after the longitudinally extending elastic band and the two transversely extending elastic strips have been stitched to the cloth cover component, with an arrow included to illustrate how the cloth cover component is then folded lengthwise over the elastic band.
FIG. 5 shows the completed middle section of the pacifier holder assembly, after the longitudinally extending marginal edge portions of the cloth cover member have been stitched together and the first and second male buckle components have been attached adjustably to its opposite ends.

The panel 31 is an elongated cover component that is shown foreshortened in FIGS. 3 and 4 for illustrative purposes. It includes a central portion 35 (i.e., an opening-defining portion) that defines a 0.5-inch wide by 2.5-inches long, rectangular opening 36 (i.e., a pacifier-receiving opening), with the opening 36 positioned halfway between opposite ends 31A and 31B of the panel 31. The fabricator (not shown) forms (e.g., cuts) the opening 36 in the panel 31 during fabrication of the middle section 20 so that the opening 36 extends transversely from a first longitudinally extending edge 31C of the panel 31 to a position halfway across the panel 31 toward a second longitudinally extending edge 31D, as illustrated in FIG. 3.

Next, the fabricator attaches (i.e., stitches) the elastic band 32 to the panel 31, with the elastic band 32 in the position shown in FIG. 4 (i.e., with the elastic band extending longitudinally in a position intermediate the opening 36 and the second longitudinally extending edge 31D). The fabricator stretches the elastic band 32 longitudinally (i.e., along the axis of elongation 32A) and holds it stretched tautly while stitching it to the panel 31. The fabricator also stitches to the panel 31 the opposite end portions of each of the elastic strips 33 and 34 (FIG. 4), with the elastic strips 33 and 34 positioned along opposite sides of the opening 36 as shown in FIG. 4.

After completing the above steps, the fabricator folds the panel 31 in half lengthwise as indicated by the curved arrowhead 37 in FIG. 4, so that the panel 31 covers the elastic band 32 and the elastic strips 33 and 34. Then, the fabricator stitches the first and second longitudinally extending end portions 31C and 31D together to complete the middle section 20. Broken lines indicate stitching in FIGS. 4 and 5; stitching 38 in FIG. 4, for example, indicates stitching of the elastic band 32. With the middle section 20 completed that way, the fabricator then threads each of the end portions 31A and 31B through a respective one of two male buckle components 40A and 41A (i.e., components of first and second buckles 40 and 41 shown in FIG. 1). That readies the middle section 20 for attachment to mating female buckle components of the first and second buckles 40 and 41 (e.g., female buckle component 40B in FIG. 6).

Figure 6:
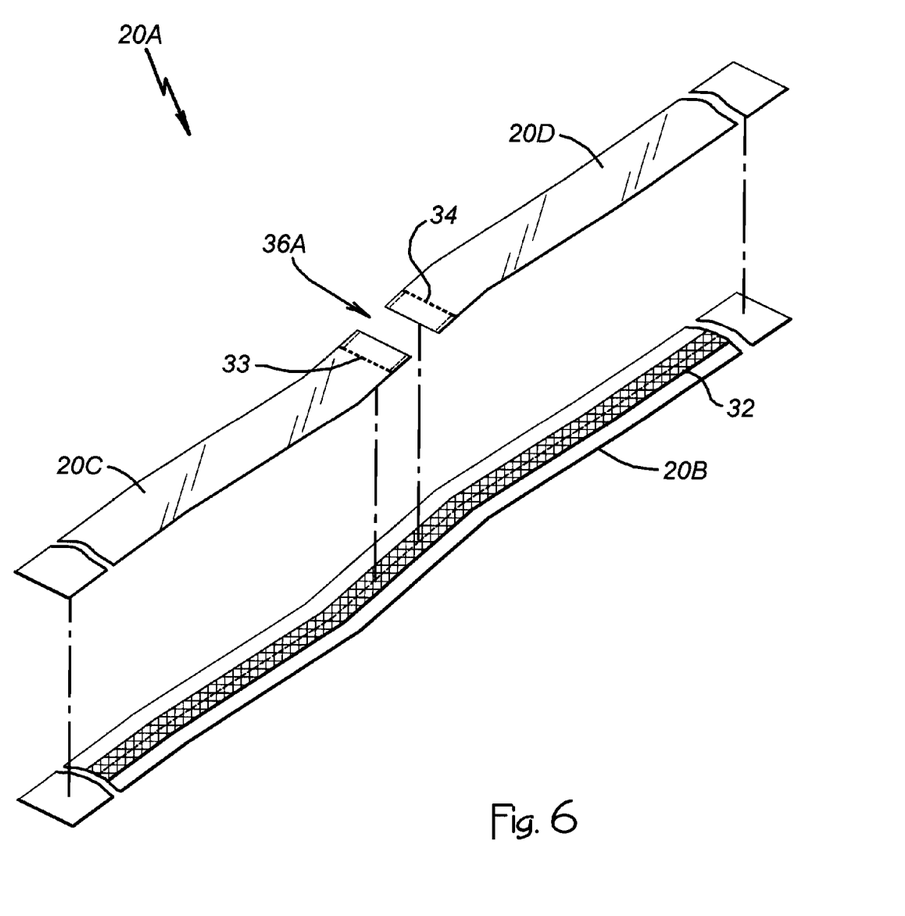
FIG. 6 is an exploded view similar to FIG. 3 that illustrates a different method of fabricating the middle section.

Based upon the foregoing and subsequent descriptions, and the claims, a person having ordinary skill in the art (i.e., a PHOSITA) can readily implement an assembly constructed according to the present invention. FIG. 6 illustrates, for example, fabrication of a middle section 20A using three separate pieces 20B, 20C, and 20D of cloth, instead of folding the panel 31. The fabricator stitches the separate pieces together along their marginal edges after first stitching the elastic band 32 to the piece 20B and after stitching each of the elastic strips 33 and 34 to a respective one of the pieces 20C and 20D. A space between the pieces 20C and 20D results in an opening 36A that is a counterpart of the opening 36 in the middle section 20.

Figure 7:
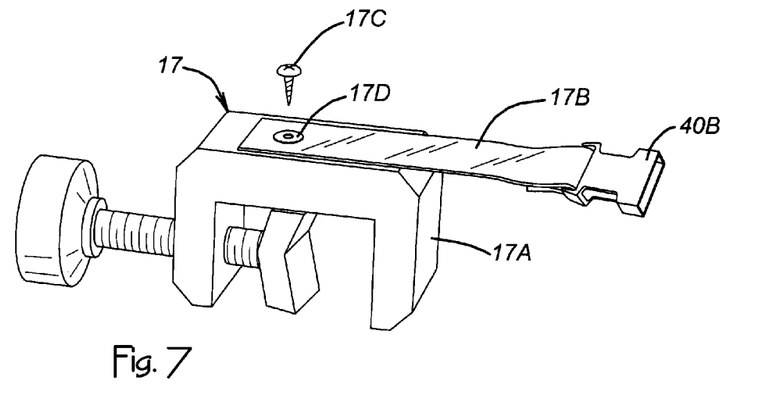
FIG. 7 is an enlarged perspective view of the first mounting strap component, with one end attached to the first mounting clamp and the opposite end connected to the first female buckle component.

FIG. 7 is an enlarged perspective view of the mounting component 17. The mounting component 18 is similar to the mounting component 17, and so only the mounting component 17 is described in further detail. The mounting component 17 includes a clamp 17A (e.g., a commercially available plastic clamp) to which a female buckle component 40B of the first buckle 40 is attached via a strap 17B. The strap 17B is preferably fabricated from the same material used for the panel 31, although other materials will suffice inasmuch as the strap 17B does not normally contact the child 13 in the crib 14. The fabricator screws a screw 17C through a reinforcing washer 17D on the strap 17B and into the clamp 17A in order to secure the strap 17B to the clamp 17A.

The illustrated buckles 40 and 41 are commercially available, quick-disconnect buckles of plastic composition (e.g., those sometimes commonly referred to as "side release" buckles). However, other mounting alternatives for holding the middle section on the top side rails 15 and 16 of the crib 14 may be provided within the broader inventive concepts disclosed. Hook-and-loop fabric fastener arrangements may be provided, instead, for attaching opposite ends of the middle section 20 to the top side rails. Means for tying the opposite ends of the middle section 20 to the top side rails may be used. The buckles 40 and 41, however, enable a quick disconnect of the middle section 20 when desired, in order to position the middle section 20 out of the way, to use it elsewhere, to clean it, or to facilitate replacement of the pacifier.

Figure 8:
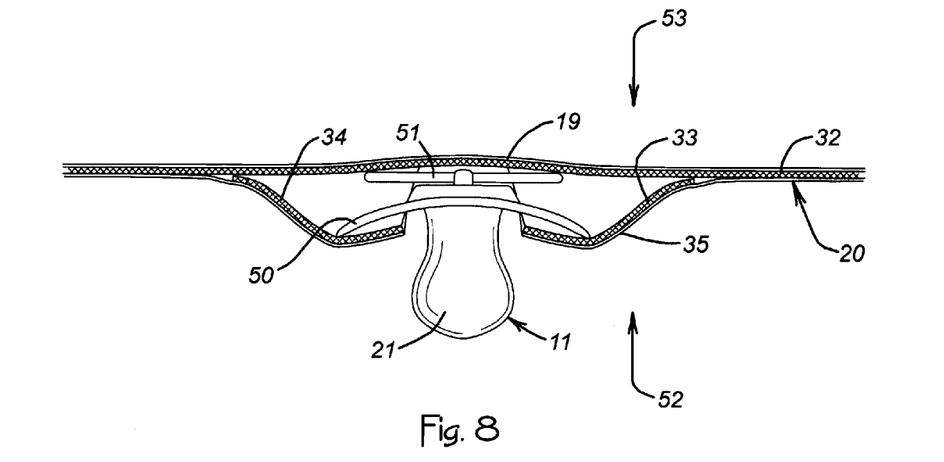
FIG. 8 is an enlarged view of the pacifier-holding portion of the middle section of the pacifier holder assembly, with portions in cross section as viewed in a vertical plane extending through the middle section.

FIG. 8 is an enlarged view of the pacifier-holding portion 19 of the middle section 20, with the pacifier 11 held removably by the middle section 20 so that the nipple-simulating member 21 of the pacifier 11 extends though the opening 36. The illustrated pacifier 11 includes a guard 50 and a handle 51 that the user presses through the opening 36 in order to mount the pacifier 11 on the middle section 20 of the assembly 10 in that orientation. Recall that the central portion 35 defines the 0.5-inch wide by 2.5-inch long, rectangular opening 36. The user distorts the central portion 35 (against opposition of the elastic strips 33 and 34) in order to press the guard 50 and the handle 51 through the opening 36 and into the positions shown in FIG. 8. Then, the central portion 35 recovers and the elastic band 32 cooperates with the elastic strips 33 and 34 to hold the pacifier 11 removably in that position. The nipple-simulating member 21 extends in the direction faced by a first side 52 of the middle section 20 (i.e., the side that faces downwardly toward the child 13 when the assembly 10 is used as shown in FIG. 1), and away from an oppositely facing second side 53 of the middle section 20 (i.e., the side that faces upwardly in use).

Figure 9:
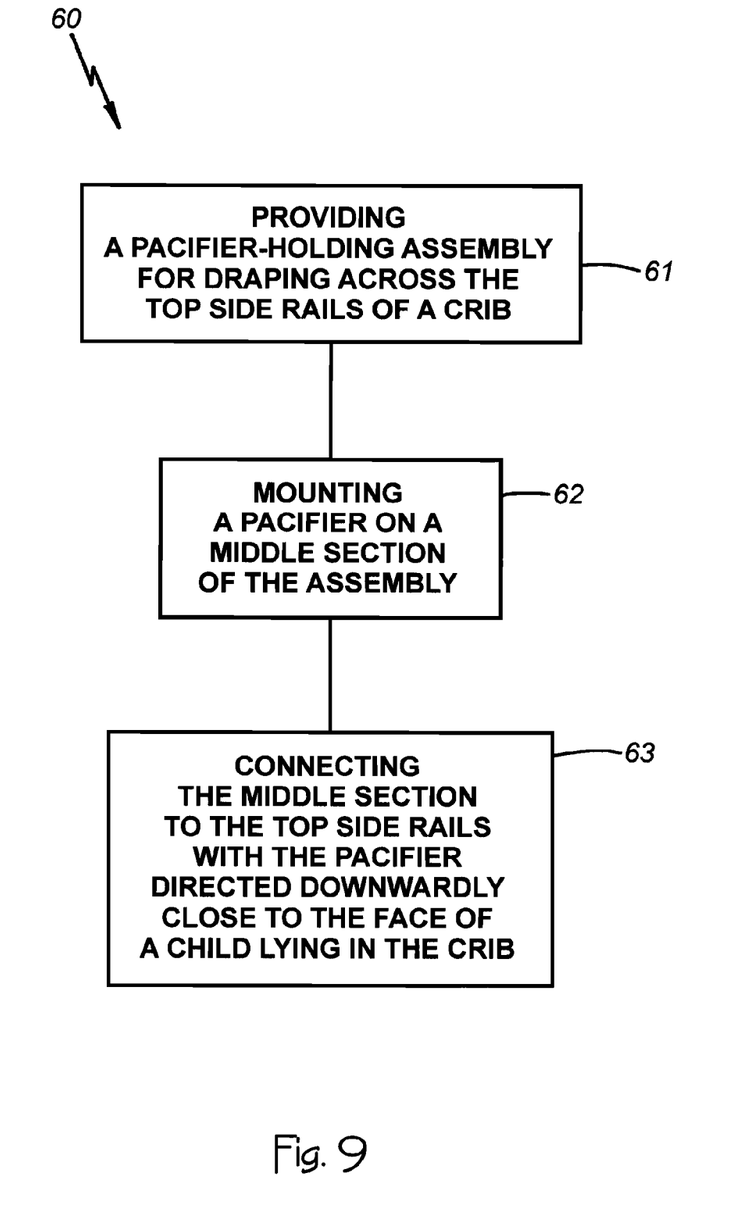
FIG. 9 a block diagram that summarizes the methodology of the present invention.

FIG. 9 is a block diagram 60 of the methodology of the present invention. The method begins, as indicated by a block 61, with a step of providing a pacifier-holding assembly having a length sufficient for the assembly to be draped between the top side rails of the crib; the assembly includes a middle section for holding the pacifier and mounting components for connecting the middle section to the top side rails. The method proceeds, as indicated by a block 62, by mounting the pacifier on the middle section of the pacifier-holding assembly, and, as indicated by a block 63, by connecting the mounting components to the top side rails, with the pacifier-holding assembly draped between the top rails and the pacifier close to the face of the child. For the illustrated assembly 10, the step of connecting the middle section to the top side rails includes clamping the mounting components on the top side rails and buckling the middle section to the mounting components.

Thus, the present invention safely and conveniently facilitates nonnutritive sucking by holding a pacifier close to the face of a child lying in the crib using a pacifier holder assembly draped across and attached to the top side rails of the crib. With the pacifier held that way, the nipple-simulating member can induce the routing reflex and lead to the suck-swallow reflex without the pacifier holder assembly posing a threat of entanglement. In addition, the pacifier holder assembly can be used apart from the crib, on a child car seat for example. Although an exemplary embodiment has been shown and described, one of ordinary skill in the art may make many changes, modifications, and substitutions without necessarily departing from the spirit and scope of the invention. As for the specific terminology used to describe the exemplary embodiment, it is not intended to limit the invention; each specific term is intended to include all technical equivalents that operate in a similar manner to accomplish a similar purpose or function.

What is claimed is:

1. An apparatus for holding a pacifier close to a face of a child lying in a crib having opposite first and second top side rails, the apparatus comprising:
   an elongated assembly having a length sufficient for the assembly to be draped across the first and second top side rails of the crib;
   a middle section of the assembly, said middle section including pacifier-holding portion for holding the pacifier; and
   mounting components for holding the middle section on the first and second top side rails of the crib with the assembly draped across the first and second top side rails so that the pacifier extends downwardly to a position close to the face of the child lying in the crib;
   wherein the middle section of the elongated assembly includes an elastic band that extends along an axis of elongation of the elastic band;
   wherein the middle section of the elongated assembly includes an elongated cover component that extends along said axis of elongation, said elongated cover component covering the elastic band and including an opening-defining portion intermediate first and second terminal end portions of the elongated cover component; said opening-defining portion defining a pacifier-receiving opening in the cover component for receiving the pacifier; and
   wherein the middle section of the elongated assembly includes a pair of first and second elastic strips extending transversely across the cover component on opposite sides of the opening, said first and second elastic strips cooperating with the elastic band to hold the pacifier with the pacifier-receiving opening so that a nipple-simulating member of the pacifier extends outwardly away from the cover component.

2. An apparatus as recited in claim 1, wherein the middle section of the assembly is adapted to hold the pacifier removably in order to facilitate removal of the pacifier from the middle section when desired.

3. An apparatus as recited in claim 1, wherein the cover component includes an elongated length of cloth to which the elastic band is attached, said elongated length of cloth being folded lengthwise over the elastic band to form the cover component.

4. An apparatus as recited in claim 1, wherein the cover component includes a first piece of cloth to which the elastic band is attached, and two separate pieces of cloth attached to the first piece of cloth to form the cover component; said two separate pieces of cloth being spaced apart from each other to form the pacifier-receiving opening.

5. An apparatus as recited in claim 1, wherein the elongated assembly includes a pair of first and second buckle components for removably connecting the middle section to the mounting components.

6. An apparatus as recited in claim 1, wherein the elongated assembly includes a pair of first and second clamp components for removably attaching the mounting components to the first and second top side rails of the crib.

* * * * *